Figure 1:
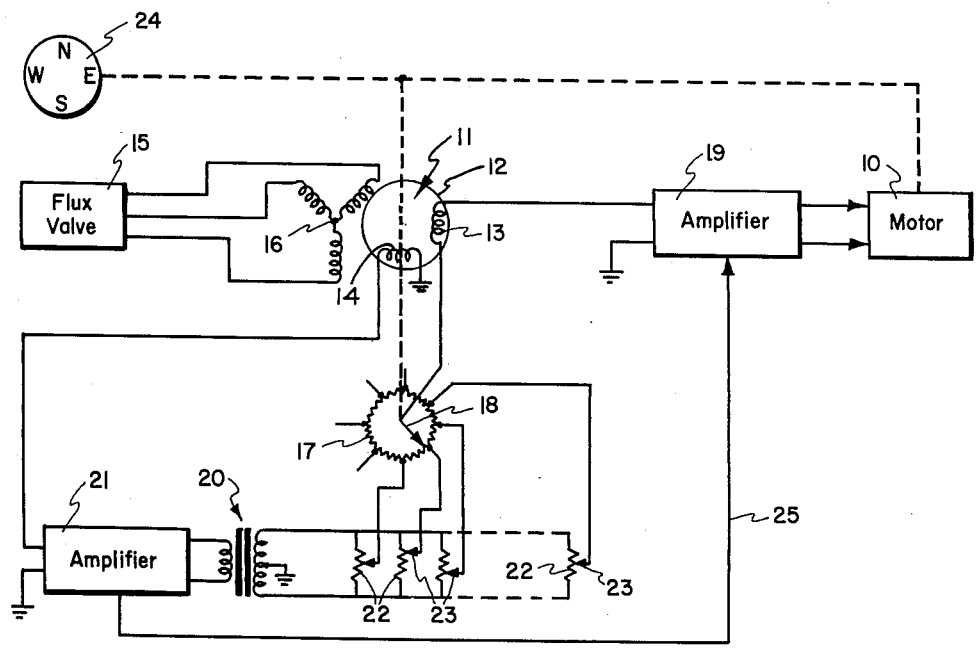

May 1, 1962 F. E. SCHULTE 3,031,766
MAGNETIC COMPASS COMPENSATING SYSTEM
Filed July 29, 1958 2 Sheets-Sheet 1

FIG. I

*INVENTOR.*
FREDRICK E. SCHULTE
BY

May 1, 1962   F. E. SCHULTE   3,031,766
MAGNETIC COMPASS COMPENSATING SYSTEM
Filed July 29, 1958   2 Sheets-Sheet 2

INVENTOR.
FREDRICK E. SCHULTE
BY

United States Patent Office

3,031,766
Patented May 1, 1962

3,031,766
MAGNETIC COMPASS COMPENSATING SYSTEM
Fredrick E. Schulte, Grand Rapids, Mich., assignor to Lear, Incorporated
Filed July 29, 1958, Ser. No. 751,711
4 Claims. (Cl. 33—224)

This invention relates to magnetic compass systems and more particularly to the deviation compensation for magnetic compass systems.

When a magnetic compass system is used in an aircraft, there are many factors which tend to cause the compass to give an erroneous reading. One of these factors is the permanent magnetic field set up by various metal parts such as the aircraft engine. Another is the distortion of the earth's magnetic field due to the presence of metal parts which in themselves do not produce a magnetic field. These two effects cause errors which also vary as a function of aircraft heading. These and other factors are variables which must be compensated in order to make the compass accurate under all conditions.

Some presently known arrangements consist of mechanical cam devices which physically displace servo output shafts by preset amounts. These mechanical arrangements are subject to severe errors during vibration and shock because they are comprised of spring mass assemblies. Also they must be intimately associated with the mechanical rotating shaft and therefore difficult and costly to locate within a hermetically sealed inclosure and still permit adjustment external to the inclosure.

As disclosed in application for Letters Patent, "Compass System," Serial No. 701,904, now abandoned, filed Dec. 10, 1957, and assigned to the assignee of this application, electrical deviation compensators for flux valve-type sensing elements can be constructed. The present invention is an improved method of providing deviation compensation for a magnetic compass system.

It is, therefore, an object of this invention to provide an electrical means for imparting corrections to the output of a closed looped servo.

Another object of this invention is to provide an electrical means for deviation compensation for a magnetic compass system.

Still another object of this invention is to provide compass deviation compensation for a magnetic compass system which has a built-in automatic gain control for the amplifier driving the compass slaving servo.

Figure 2:
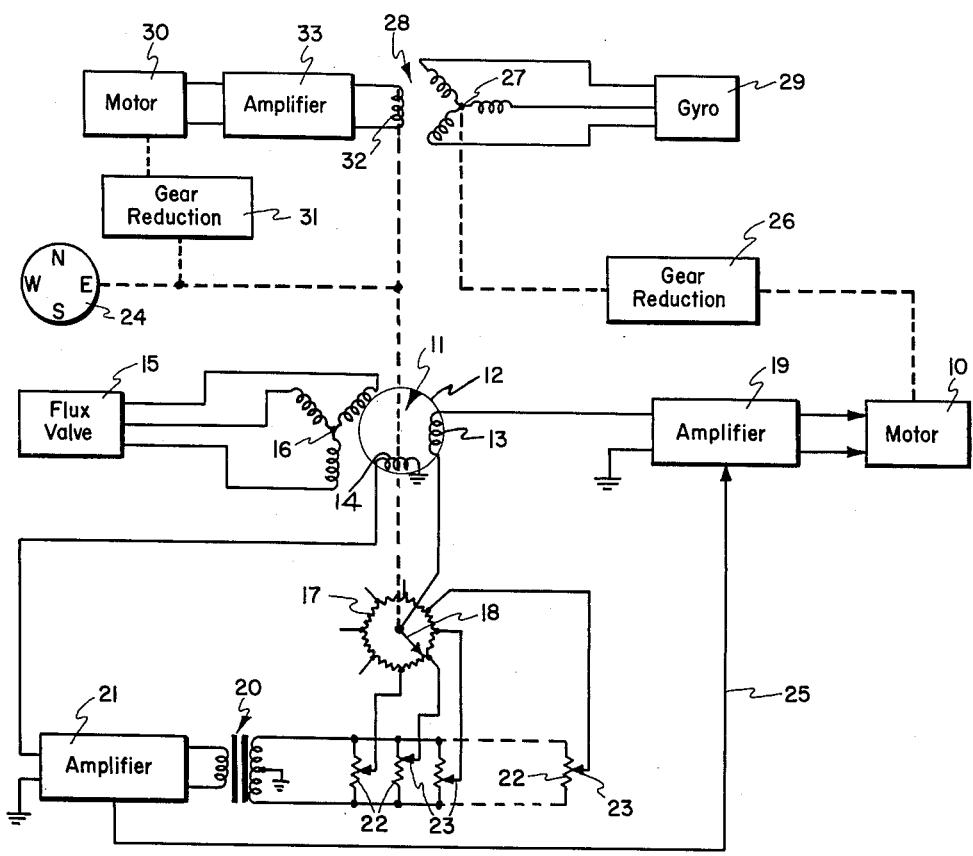

A fuller understanding of the objects and advantages of this invention will become apparent from the following description when taken in conjunction with the drawing in which:

FIG. 1 is a schematic of the present invention; and
FIG. 2 is a schematic of the second embodiment of the present invention.

Referring now to FIG. 1, there is shown a synchro 11 having a rotor 12 which is driven by a two-phase motor 10. The normal center tap null is detected by the winding 13 of synchro 11. A second winding 14, also part of synchro 11 is displaced from winding 13 by 90 degrees such that a maximum voltage appears across winding 14 when winding 13 is set to null. A flux valve sensing element 15 electrically connected to the stator 16 of synchro 11 is used to excite the synchro 11. A continuously wound automatically set potentiometer 17 has its wiper arm 18 mechanically connected to the rotor 12 such that movement of the rotor 12 causes simultaneous movement of the wiper arm 18. One end of winding 13 is electrically connected to the wiper arm 18. The other end of winding 13 is electrically connected by way of amplifier 19 to the motor 10. An isolation transformer 20 is electrically connected by way of amplifier 21 to one end of winding 14. The other end of winding 14 is grounded.

A series of manually set potentiometers 22 are connected in parallel to the output of transformer 20. Wiper arms 23 of the potentiometers 22 are individually connected to uniformly spaced taps on potentiometers 17. A compass card 24 is also driven by the motor 10.

Amplifier 19 is also electrically connected by lead 25 to the output of amplifier 21. The signal received by amplifier 19 from amplifier 21 controls the gain of amplifier 19.

In operation the three-wire electrical signals emitted by the flux valve sensing element 15 are used to excite synchro 11 in the normal fashion. The output of this synchro is normally used as the error signal for either a servo or gyro follow-up pertinent to the magnetic heading with the loop being closed through the amplifier 19 and actuating mechanism 10. The position of the rotor 12 of the synchro 11 relative to the stator 16 of the synchro 11 is determined by the output of the motor 10.

In this description of the present invention, the motor 10 also drives compass card 24 and the wiper arm 18 of potentiometer 17. The output of the winding 14 which is at a maximum when the output of the winding 13 is at null, is fed through the amplifier 21 to the transformer 20. The angular displacement with respect to north of the aircraft determines the position or angular displacement of the rotor 12. This in turn determines which wiper arm 23 of the manually set potentiometers 22 will be in electrical proximity with the wiper arm 18 of the automatically set potentiometer 17.

As stated above, the earth's magnetic field is influenced by the presence of magnetic materials within the aircraft. The influence varies as a function of heading and, therefore, the electrical compensation must vary also. For this reason the wipers 23 of the potentiometers 22 are positioned to give the correct electrical compensation for a given position of the aircraft. It can be seen then that in a given position of the aircraft, the wiper arm 18 of potentiometer 17 will contact one of the electrical leads from a given potentiometer 22 and the output of transformer 20 will pass through this potentiometer, through the wiper arm 18, and be summed with electrical value picked up by the winding 13. The sum of the two values will then be used to drive the motor 10 and position the rotor 12 to null and also turn the compass to give a true reading. It is known that the level of voltage output of the flux valve 15 varies in magnitude with the geographic location of the aircraft. Therefore, the compensating electrical signal picked up by the winding 14 and summed with the signal picked up by the winding 13 will always be proportional. In other words, the amplifier 21, transformer 20, potentiometer 17 and potentiometers 22 provide an impedance or voltage varying circuit between the first winding 13 and the second winding 14.

It can be seen that as the output of the flux valve 15 varies in magnitude, the output of the amplifier 21 will also vary. This in turn will vary the gain of the amplifier 19 and cause a linear output of amplifier 19 to control the motor 10.

Referring now to FIG. 2, there is shown a more specific embodiment of the present invention wherein the motor 10 drives by way of the gear reduction 26 the three-wire winding 27 of synchro 28 rather than the rotor 12 of synchro 11 as shown in FIG. 1. A displacement gyro 29 has electrical pickoff means therein for exciting the synchro 28.

A second motor 30 is mechanically connected through gear reduction 31 to drive the compass card 24, the rotor 12 of synchro 11 and the secondary winding 32 of synchro 28. The motor 30 receives signals from the secondary winding 32 of synchro 28 by way of amplifier 33.

To understand the operation of the device shown in FIG. 2, consider first that both synchros 11 and 28 are at null, i.e., no electrical signal is emitted by the secondary of either synchro 11 or synchro 28.

Now suppose the flux valve 15 emits a fluctuating signal. The motor 10 reacts to signals emitted by the flux valve 15 and drives the primary windings 27 of synchro 28 by way of gear reduction 26. This gear reduction 26 is such that the windings 27 are moved at a very slow rate. This then provides a time integration of the signals emitted by flux valve 15. When the primary windings 27 are moved, the secondary winding 32 emits a signal and causes the motor 30 to move the compass card 24. It is to be noted that the compass card 24 responds rapidly to movements of motor 30 because gear reduction 31 is of a very low value.

It is known in the art that a gyro is very accurate for short periods of time, but over long periods of time, the gyro tends to drift, such drift producing an error. Therefore, any signals emitted by the gyro 29 immediately excite the windings 27 of synchro 28 causing the secondary winding 32 to energize the motor 30 and move the card of the compass 24. There is provided then a short term correction factor consisting of gyro 29 which has a fast response and maintains the compass 24 correctly aligned for any given short period of time. The flux valve 15 provides long term correction by way of motor 10 and gear reduction 26 which acts as a time integrator.

The circuit of FIG. 2, therefore, depicts a more practical application of the deviation and system error compensator described in FIG. 1. The content of these two descriptions should in no way imply limited application. The basic circuit may be utilized in many different systems and, therefore, its use should cover the greatest possible scope.

I claim:

1. A deviation compensator for a compass system, comprising a first synchro excited by a flux valve type sensing element, said first synchro having a rotor with a first and second winding displaced 90 degrees with respect to each other, a potentiometer impedance varying means associated with said first winding and said second winding to vary the output of said first winding as a function of the output of said flux valve type sensing element and the impedance of said impedance varying means, said impedance varying means comprising a transformer, a series of manually set potentiometers connected in parallel to the output of said second winding by way of said transformer, and an automatically set potentiometer having a wiper mechanically connected to said rotor and electrically connected to said first winding, a first motor responsive to the output of said first winding, a second synchro having a rotatable primary winding mechanically linked to said first motor, a displacement gyro having electrical pickoff means thereon electrically connected to said primary winding of said second synchro such that, displacement of said gyro rotates the field in said primary winding, a second motor electrically and mechanically connected and responsive to the output of the second winding of said second synchro such that said second motor causes said secondary winding to seek the null position of said second synchro, said second motor also being mechanically connected to the rotor of said first synchro and to said impedance varying means thereby simultaneously controlling said impedance varying means, said rotor and said secondary winding of said second synchro, a first amplifier connected between said second winding of said first synchro and said transformer to amplify the output of said second winding, a second amplifier connected between said first winding of said first synchro and said first motor to amplify the output of said first winding, said second amplifier having a gain control therein, and electrical means connecting the output of said first amplifier and the gain control of said second amplifier.

2. In combination a compass matching synchro excited by a flux valve type sensing element, said synchro having a rotor with a first and second winding displaced 90 degrees with respect to each other, impedance varying means electrically connected to said first and second windings to vary the output of said first winding, actuating means responsive to the electrical output of said first winding to control the position of said rotor and the output of said impedance varying means, said impedance varying means comprising a transformer, a series of manually set potentiometers connected in parallel to the output of said second winding by way of said transformer, an automatically set potentiometer having a wiper mechanically connected to said rotor and electrically connected to said first winding, a first amplifier connected between said second winding and said transformer to amplify the output of said second winding, a second amplifier connected between said first winding and said actuating means to amplify the output of said first winding, said second amplifier having a gain control therein and electrical means connecting the output of said first amplifier and the gain control of said second amplifier.

3. In combination: a compass matching synchro excited by a flux valve type sensing element, said synchro having a rotor with a first and second winding displaced 90° with respect to each other, impedance varying means electrically connected to said first and second windings to vary the output of said first winding, said impedance varying means comprising at least one potentiometer connected between said first and second windings, actuating means responsive to the electrical output of said first winding to control the position of said rotor and the output of said impedance varying means, an amplifier connected between said first winding and said actuating means to amplify the output of said first winding, said amplifier having a gain control therein, and electrical means connecting the output of said second winding and the gain control of said amplifier.

4. In combination: a compass matching synchro excited by a flux valve type sensing element, said synchro having a rotor with a first and second winding displaced 90° with respect to each other, impedance varying means electrically connected to said first and second windings to vary the output of said first winding, said impedance varying means comprising automatically and manually set potentiometers connected between said first and second windings, actuating means responsive to the electrical output of said first winding to control the position of said rotor and the output of said impedance varying means, an amplifier connected between said first winding and said actuating means to amplify the output of said first winding, said amplifier having a gain control therein, and electrical means connecting the output of said second winding and the gain control of said amplifier.

References Cited in the file of this patent

UNITED STATES PATENTS

| | | |
|---|---|---|
| 2,459,830 | McCarthy | Jan. 25, 1949 |
| 2,572,044 | McCarthy et al. | Oct. 23, 1951 |
| 2,581,436 | McCarthy | Jan. 8, 1952 |
| 2,760,146 | Wilentchik | Aug. 21, 1956 |
| 2,762,959 | Welch | Sept. 11, 1956 |
| 2,853,795 | Hurlburt et al. | Sept. 30, 1958 |
| 2,924,023 | Whitehead | Feb. 9, 1960 |
| 2,959,865 | Boose | Nov. 15, 1960 |
| 2,959,866 | Seaman | Nov. 15, 1960 |